(12) United States Patent
Dimou et al.

(10) Patent No.: US 12,082,188 B2
(45) Date of Patent: Sep. 3, 2024

(54) DCI CONTENT AND MODIFIED CODEBOOK TYPE 3 HARQ PUCCH CONTENT FOR DEFERRED SPS PUCCH ACK/NACK

(71) Applicant: QUALCOMM Incorporated, San Diego, CA (US)

(72) Inventors: Konstantinos Dimou, San Francisco, CA (US); Yan Zhou, San Diego, CA (US); Wanshi Chen, San Diego, CA (US); Wei Yang, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/648,118

(22) Filed: Jan. 14, 2022

(65) Prior Publication Data

US 2022/0232592 A1    Jul. 21, 2022

Related U.S. Application Data

(60) Provisional application No. 63/138,791, filed on Jan. 18, 2021.

(51) Int. Cl.
*H04W 72/12* (2023.01)
*H04L 1/1812* (2023.01)
(Continued)

(52) U.S. Cl.
CPC ....... *H04W 72/1268* (2013.01); *H04L 1/1812* (2013.01); *H04L 5/0053* (2013.01); *H04W 72/0446* (2013.01); *H04W 72/23* (2023.01)

(58) Field of Classification Search
CPC ......... H04W 72/1268; H04W 72/0446; H04W 72/23; H04L 1/1812; H04L 5/0053;
(Continued)

(56) References Cited

U.S. PATENT DOCUMENTS 11,496,246 B2 * 11/2022 Guo ...................... H04L 1/0025
11,870,732 B2 *  1/2024 Wang ................... H04L 5/0055
(Continued)

OTHER PUBLICATIONS

International Search Report and Written Opinion—PCT/US2022/012812—ISA/EPO—Apr. 8, 2022.
(Continued)

*Primary Examiner* — Eunsook Choi
(74) *Attorney, Agent, or Firm* — Procopio, Cory, Hargreaves & Savitch LLP/Qualcomm Incorporated

(57) ABSTRACT

This disclosure provides systems, devices, apparatus, and methods, including computer programs encoded on storage media, for DCI content and modified/enhanced codebook Type 3 HARQ PUCCH content for deferred SPS PUCCH ACK/NACK. In aspects, a UE may receive, from a base station, DCI including a request for HARQ-ACK feedback associated with at least one resource that is unavailable. The HARQ-ACK feedback may be based on one or more one-shot HARQ-ACK codebooks including one or more bits. The UE may transmit, to the base station, the HARQ-ACK feedback associated with the at least one resource that is unavailable, where the HARQ-ACK feedback includes the one or more one-shot HARQ-ACK codebooks including the one or more bits.

30 Claims, 14 Drawing Sheets

(51) Int. Cl.
*H04L 5/00* (2006.01)
*H04W 72/0446* (2023.01)
*H04W 72/1268* (2023.01)
*H04W 72/23* (2023.01)

(58) Field of Classification Search
CPC ..... H04L 5/001; H04L 1/1685; H04L 1/1822; H04L 1/1854; H04L 5/0055; H04L 1/1671; H04L 1/1864; H04L 1/1861
See application file for complete search history.

(56) References Cited

U.S. PATENT DOCUMENTS

| | | | |
|---|---|---|---|
| 11,902,032 B2* | 2/2024 | El Hamss | H04L 1/1854 |
| 11,917,615 B2* | 2/2024 | Yoshimura | H04L 5/0094 |
| 2022/0007399 A1* | 1/2022 | Rastegardoost | H04L 5/0055 |
| 2022/0159744 A1* | 5/2022 | Shin | H04L 5/0053 |
| 2022/0225333 A1* | 7/2022 | Liu | H04W 72/23 |
| 2023/0361938 A1* | 11/2023 | He | H04L 1/1832 |

OTHER PUBLICATIONS

Nokia, et al., "HARQ-ACK Feedback Enhancements for URLLC/IIoT", 3GPP Draft, 3GPP TSG RAN WG1 #103-e, R1-2008842, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020 (Oct. 23, 2020), XP051945381, 14 Pages, Retrieved from the Internet: URL: https://ftp.3gpp.org/tsg_ran/WG1_RL1/TSGR1_103-e/Docs/R1-2008842.zip [Retrieved on Oct. 23, 2020] p. 6, Sec. 2, pp. 1-3, figs. 2.1, 2.2 Sec. 6 , pp. 6-8.

Qualcomm Incorporated: "HARQ-ACK Enhancement for IOT and URLLC", 3GPP Draft, R1-2009257, 3GPP TSG RAN WG1 #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 24, 2020 (Oct. 24, 2020), XP051946920, 11 Pages, Retrieved from the Internet: URL: https://ftp.3gpp.org/tsg_ran/WG1_RL1/TSGR1_103-e/Docs/R1-2009257.zip [retrieved on Oct. 24, 2020] Sec. 2, pp. 1-2, fig. 1 Sec. 5, pp. 6-7, fig. 7.

MVO: "HARQ-ACK Enhancements for Rel-17 URLLC", 3GPP Draft, R1-2007655, 3GPP TSG RAN WG1#103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), KP051946461, 7 Pages, Retrieved from the Internet: URL: https://ftp.3gpp.org/tsg_ran/WG1_RL1/TSGR1_103-e/Docs/R1-2007655.zip [retrieved on Oct. 24, 2020] the whole document, Sec. 2.1.1, pp. 1-4, figs. 1-4, Sec. 2.2, pp. 5,6.

* cited by examiner

DCI CONTENT AND MODIFIED CODEBOOK TYPE 3 HARQ PUCCH CONTENT FOR DEFERRED SPS PUCCH ACK/NACK

CROSS REFERENCE TO RELATED APPLICATION(S)

This application claims the benefit of and priority to U.S. Provisional Application Ser. No. 63/138,791, entitled "DCI CONTENT AND MODIFIED CODEBOOK TYPE 3 HARQ PUCCH CONTENT FOR DEFERRED SPS PUCCH ACK/NACK" and filed on Jan. 18, 2021, which is expressly incorporated by reference herein in its entirety.

TECHNICAL FIELD

The present disclosure relates generally to communication systems, and more particularly, to downlink control information (DCI) content and modified codebook Type 3 hybrid automatic repeat request (HARQ) physical uplink control channel (PUCCH) content for deferred semi-persistent scheduling (SPS) PUCCH acknowledgement/negative-acknowledgment (ACK/NACK).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from a base station, downlink control information (DCI) including a request for hybrid automatic repeat request (HARD)-acknowledgment (ACK) (HARQ-ACK) feedback associated with at least one resource that is unavailable, the HARQ-ACK feedback based on one or more one-shot HARQ-ACK codebooks including one or more bits; and transmit, to the base station, the HARQ-ACK feedback associated with the at least one resource that is unavailable, the HARQ-ACK feedback including the one or more one-shot HARQ-ACK codebooks including the one or more bits.

In another aspect of the disclosure, a method, a computer-readable medium, and an apparatus are provided. The apparatus may transmit, to a user equipment (UE), DCI including a request for HARQ-ACK feedback associated with at least one resource that is unavailable, the HARQ-ACK feedback based on one or more one-shot HARQ-ACK codebooks including one or more bits; and receive, from the UE, the HARQ-ACK feedback associated with the at least one resource that is unavailable, the HARQ-ACK feedback including the one or more one-shot HARQ-ACK codebooks including the one or more bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
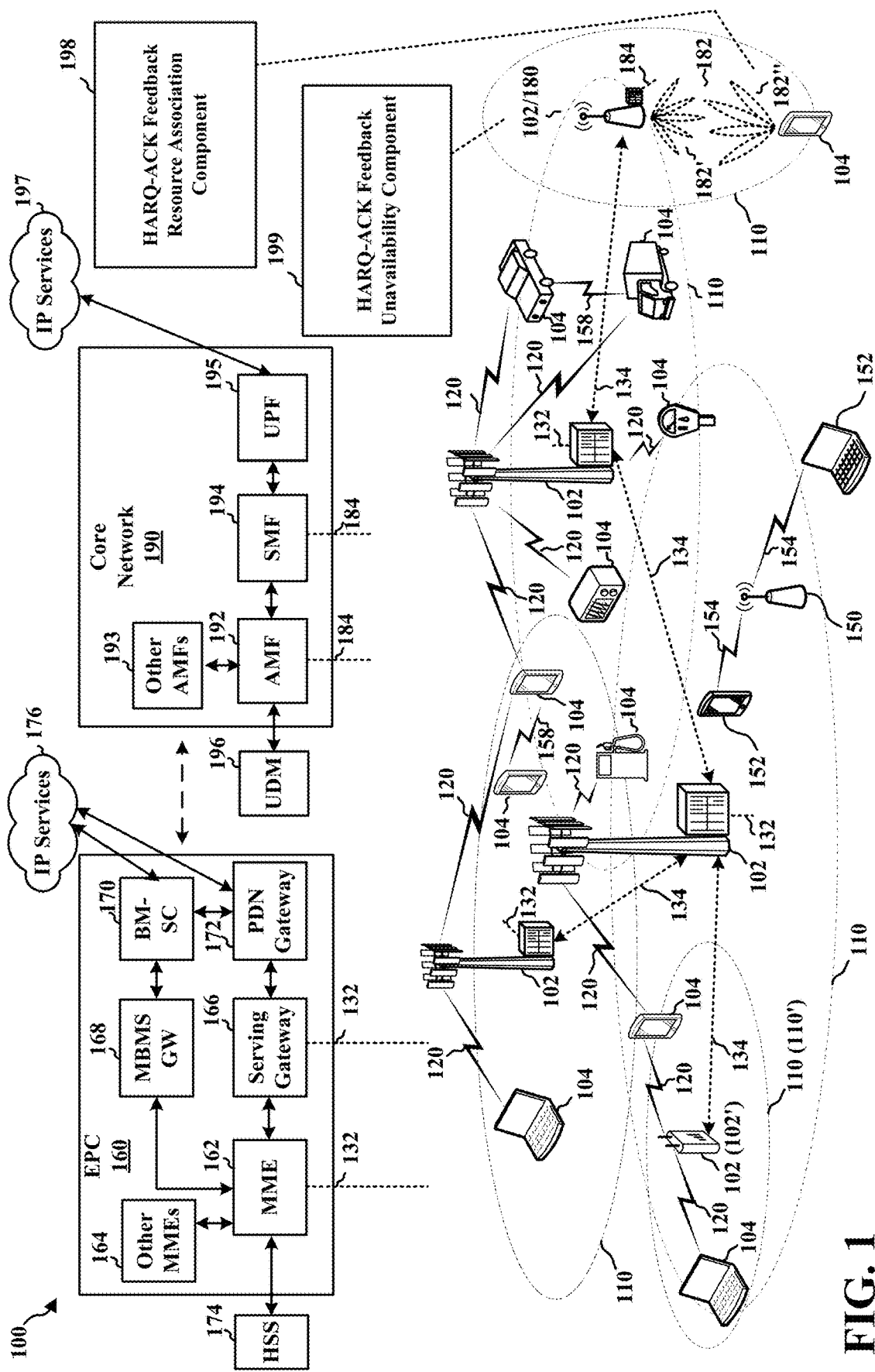
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a hybrid automatic repeat request (HARQ)-acknowledgment (ACK) (HARQ-ACK) feedback resource association component 198 configured to receive, from a base station, downlink control information (DCI) including a request for HARQ-ACK feedback associated with at least one resource that is unavailable, the HARQ-ACK feedback based on one or more one-shot HARQ-ACK codebooks including one or more bits; and transmit, to the base station, the HARQ-ACK feedback associated with the at least one resource that is unavailable, the HARQ-ACK feedback including the one or more one-shot HARQ-ACK codebooks including the one or more bits. In certain aspects, the base station 180 may include a HARQ-ACK feedback unavailability component 199 configured to transmit, to a user equipment (UE), DCI including a request for HARQ-ACK feedback associated with at least one resource that is unavailable, the HARQ-ACK feedback based on one or more one-shot HARQ-ACK codebooks including one or more bits; and receive, from the UE, the HARQ-ACK feedback associated with the at least one resource that is unavailable, the HARQ-ACK feedback including the one or more one-shot HARQ-ACK codebooks including the one or more bits. Although the following description may be focused on 5G NR, the concepts described herein may be applicable to other similar areas, such as LTE, LTE-A, CDMA, GSM, and other wireless technologies.

Figure 2:
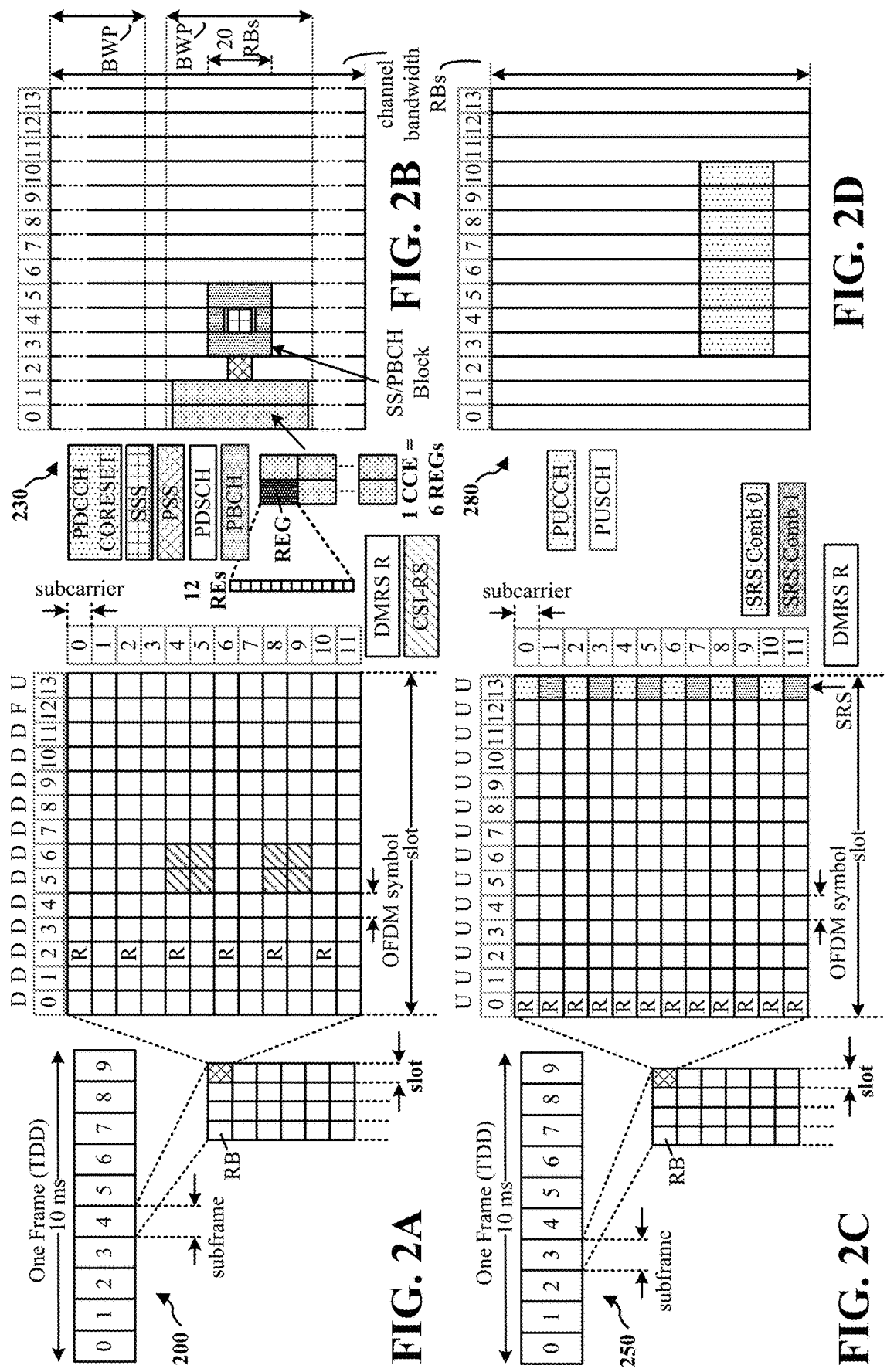
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
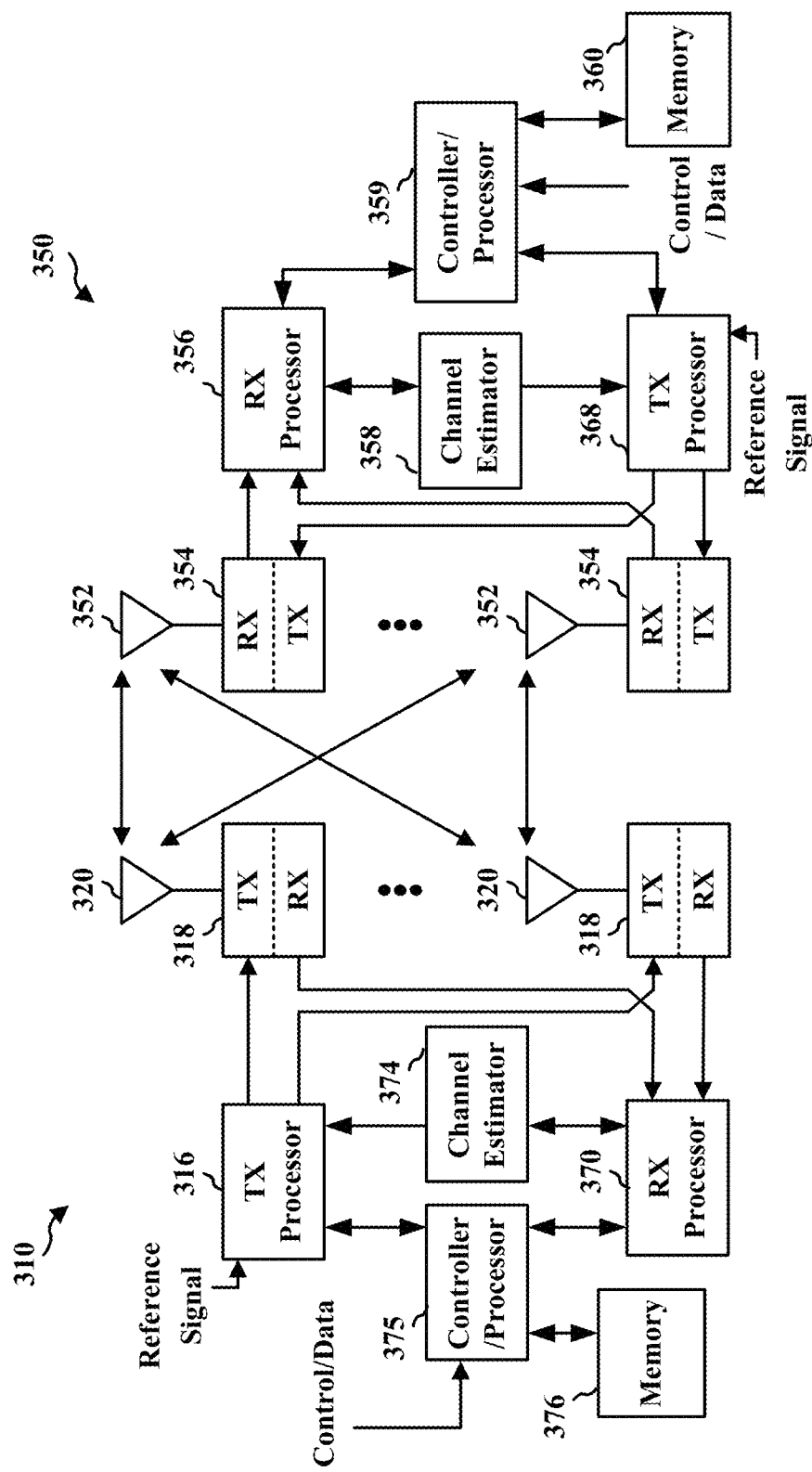
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the HARQ-ACK feedback resource association component 198 of FIG. 1.

At least one of the TX processor 316, the RX processor 370, and the controller/processor 375 may be configured to perform aspects in connection with the HARQ-ACK feedback unavailability component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
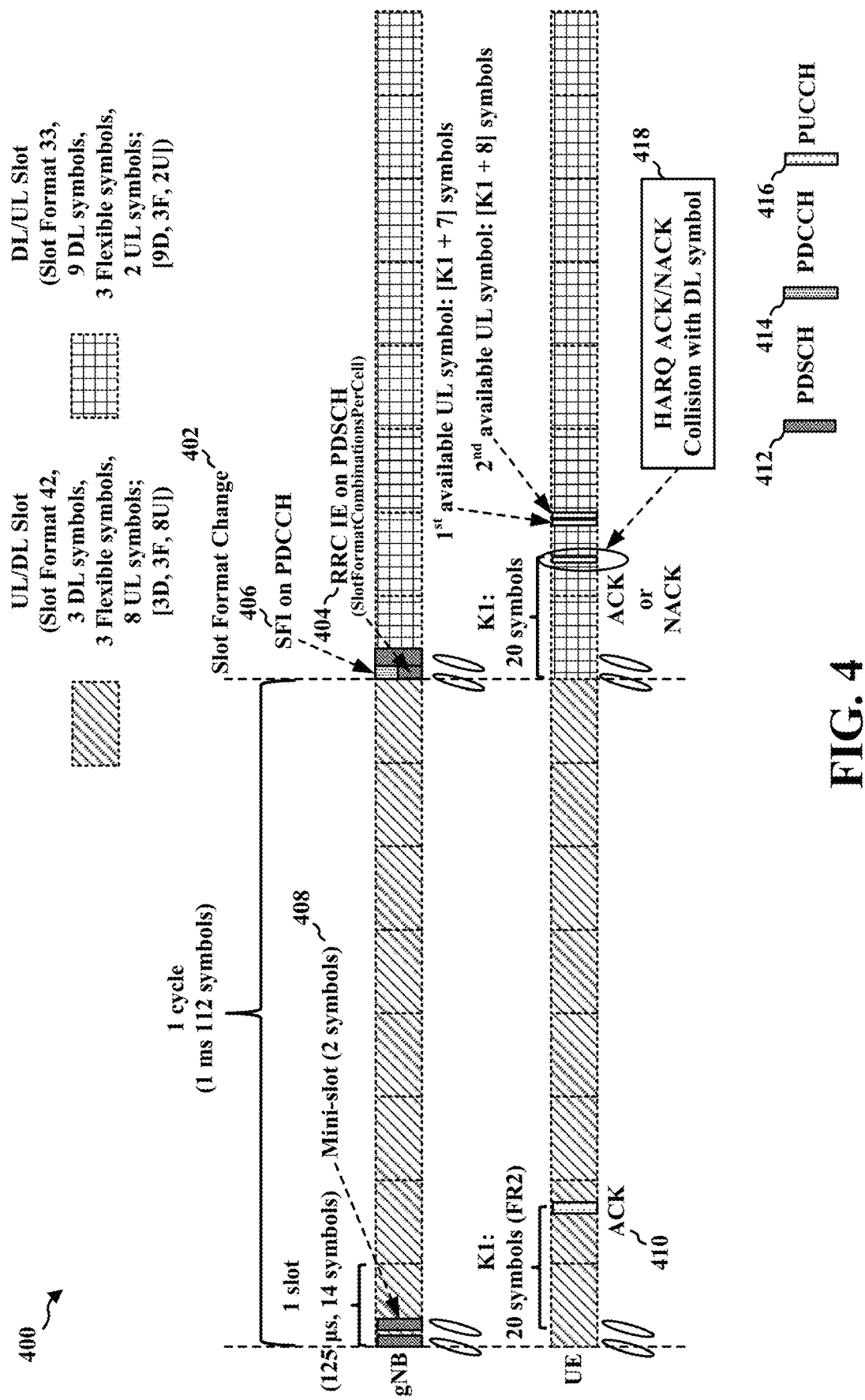
FIG. 4 is a diagram associated with a slot format change performed via a radio resource control (RRC) information element (IE) or a slot format indicator (SFI).

FIG. 4 is a diagram 400 associated with a slot format change 402 performed via RRC information element (IE) 404 or an SFI 406. In examples, the slot format change 402 may correspond to a URLLC procedure or an industrial IoT (IIoT) procedure. For instance, a URLLC sensor or an IIoT sensor may communicate with a controller of the URLLC sensor or the IIoT sensor based on a semi-persistent scheduling (SPS) configuration having a certain periodicity (e.g., a periodicity of 1 ms). For example, every 1 ms the controller may transmit a message to the sensor for which the sensor may report feedback to the controller that corresponds to the message.

The diagram 400 illustrates that a mini-slot 408 of 2 symbols may be granted to a UE (e.g., the sensor/device) for receiving a payload from a base station/controller. The SPS configuration may include a field for SPS PUCCH HARQ ACK/NACK, which may be indicative of a PUCCH format, resources to be used for the feedback, the periodicity, a UCI payload to be transmitted at each transmission occasion, etc. The UE may be requested by the base station to transmit feedback to the base station based on a minimum time difference for the SPS PUCCH HARQ ACK/NACK. For instance, the feedback, such as an ACK 410 associated with an FR2 communication, may be transmitted 20 symbols after the mini-slot 408 granted to the UE, e.g., based on a K1 value equal to 20 symbols.

Changes in slot format configurations may be based on RRC parameters. For example, the slot format change 402 may be associated with a TDD pattern that is indicated based on an RRC IE 404, such as a SlotFormatCombinationsPerCell or other appropriate IE. The RRC parameter/RRC IE 404 may be used to initiate the change in the slot format via PDSCH resources 412. At the RRC level, a configuration of a cell may be associated with a configuration of the TDD pattern. For example, a TDD pattern of 10 ms may include UL slots for the first 5 ms of the TDD pattern and DL slots for the last 5 ms of the TDD pattern. The diagram 400 illustrates, as an example, a slot format change 402 from a first slot format (e.g., Slot Format 42) to a second slot format (Slot Format 33). Slot Format 42 may be an UL-heavy slot format with 8 UL symbols, 3 DL symbols and 3 flexible symbols, whereas Slot Format 33 may be a DL-heavy slot format with 9 DL symbols, 2 UL symbols, and 3 flexible symbols. The base station/network may initiate the switch from the first slot format to the second slot format if the base station/network determines, e.g., that the traffic load in the DL is heavier than the traffic load in the UL.

The SPS configuration may be configured at the RRC level. However, the symbols in which UL feedback is to be transmitted may no longer be available after the slot format change occurs. That is, UL symbols associated with the SPS configuration may correspond to DL symbols after the slot format change 402. A reconfiguration of the SPS configuration may not occur at lower layers, as the network may not have enough time to react to the slot format change 402. Thus, the SPS configuration/reconfiguration may be performed via RRC on PDSCH resources 412. A timeframe over which the slot format change 402 may occur can be 3-5 ms. Accordingly, the UE may defer transmission of SPS PUCCH HARQ ACK/NACK that collides with DL symbols (e.g., at 418) to a first available PUCCH resource 416 (e.g., first available UL symbol at K1+7 symbols after the slot format change 402). The deferral may be implemented in a low complexity manner to the UE. The UE may defer SPS PUCCH HARQ ACK/NACK that is dropped (e.g., at 418) based on certain conditions, such as TDD configuration collisions, until the next available PUCCH resource 416 based on a semi-static configuration of the slot format (e.g., based on semi-statically configured flexible symbols available for the PUCCH).

In the diagram 400, a HARQ ACK/NACK collision occurs, at 418, with a DL symbol, after the slot format change 402 from the first slot format to the second slot format, based on the configuration of the first slot format indicating that the UE is to transmit feedback in the symbol. However, the symbol that previously corresponded to an UL symbol/sub-slot in the first slot format configuration may no longer be available as an UL symbol/sub-slot in the second slot format configuration. The corresponding symbol in the second slot format configuration may correspond to a DL symbol/sub-slot that causes a collision, at 418, with the HARQ ACK/NACK feedback. Thus, the UE may have to either cancel the HARQ ACK/NACK feedback or transmit the HARQ ACK/NACK feedback at a different time (e.g., deferral to a first available UL symbol/sub-slot). The UE may select, from a set of K1 values, a particular K1 value that corresponds to an earliest available PUCCH resource 416 for deferring the feedback.

The slot format change 402 may alternatively correspond to the SFI 406. The SFI may be indicated from the base station to the UE via DCI on PDCCH resources 414. The SFI 404 may indicate/request a change of the slot format configuration. However, a reconfiguration of the SPS configuration may not occur within a slot format change cycle of the SFI 406, as the network may not have enough time to react to the slot format change 402.

Figure 5:
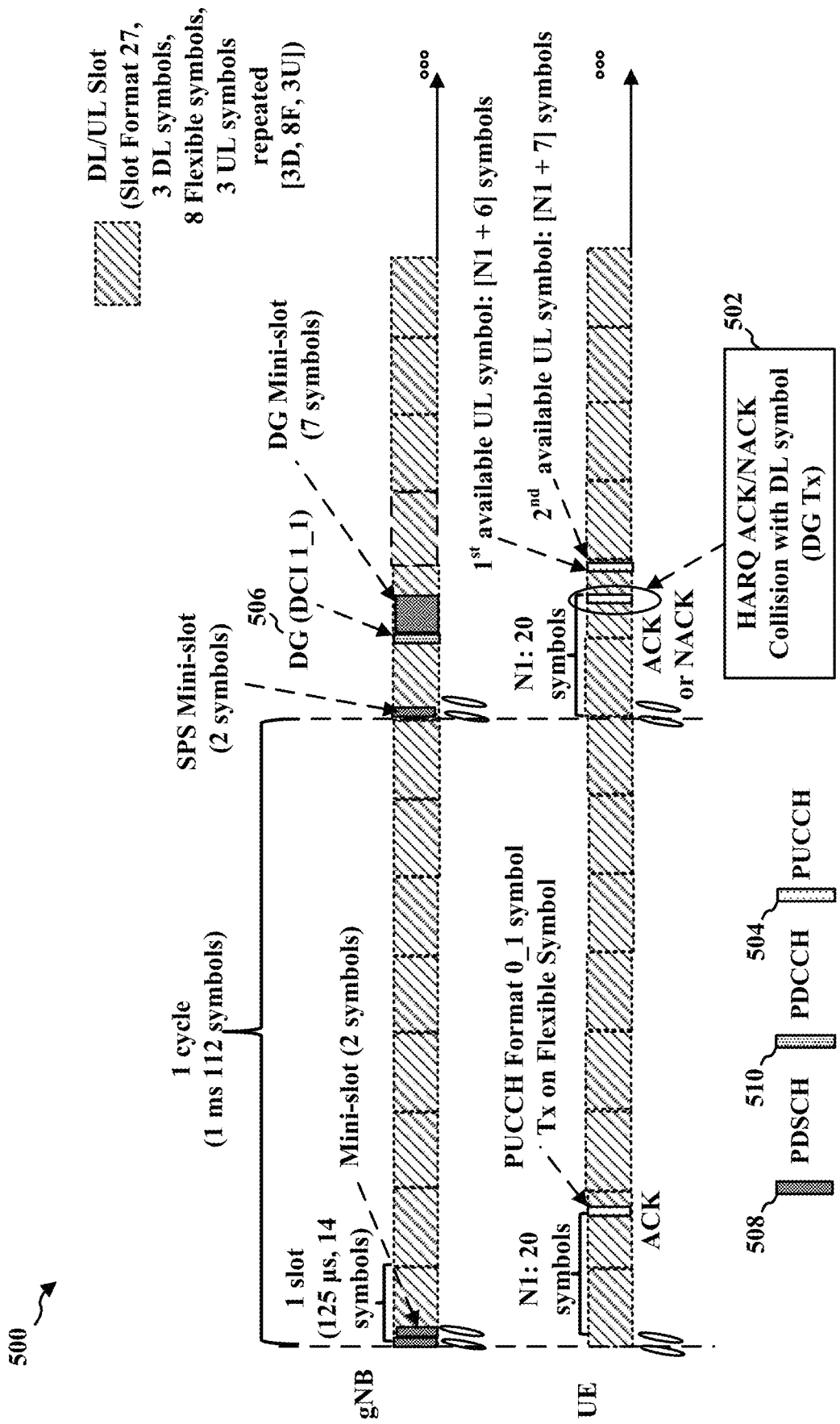
FIG. 5 is a diagram associated with a semi-persistent (SPS) physical uplink control channel (PUCCH) hybrid automatic repeat request (HARD)-acknowledgment (ACK) (HARQ-ACK) feedback collision with a DL symbol.

FIG. 5 is a diagram 500 associated with an SPS PUCCH HARQ feedback collision (e.g., at 502) with a DL symbol. A TDD slot format configuration may include DL symbols, UL symbols, and flexible symbols. The flexible symbols may be used as either DL symbols or UL symbols based on a DCI allocation for a particular slot. That is, a flexible symbol may be switched between UL resources and DL resources of the slot format configuration.

UL feedback on PUCCH resources 504 (e.g., SPS PUCCH HARQ ACK/NACK) may be configured on a flexible symbol in the slot format configuration. A dedicated grant 506 (e.g., DCI 1_1) for a PDSCH resource 508 may cause the collision, at 502, between the SPS PUCCH HARQ ACK/NACK and the DL symbol, as the flexible symbol previously used for the SPS PUCCH HARQ ACK/NACK on UL may be switched to a DL symbol for the dedicated grant 506 of the PDSCH resource 508. As a result, the UE and/or the base station may determine a different symbol, slot, or sub-slot on which the colliding SPS PUCCH HARQ feedback may be transmitted on UL. The dedicated grant 506 may be transmitted to the UE on PDCCH resources 510.

In the SPS configuration, the UL feedback may be transmitted at symbol 20, where symbol 20 may correspond to a flexible symbol. At a later time, high priority DL traffic may be scheduled on a corresponding flexible symbol, such that the flexible symbol may be used for DL communication. For example, the flexible symbol previously used for the SPS PUCCH HARQ ACK/NACK on UL may be switched for the dedicated grant 506 of the PDSCH resource 508 on DL. Thus, the UL feedback for a next SPS occasion may not be transmitted on the flexible symbol, such that the UE may determine a different symbol, slot, or sub-slot to transmit the colliding UL feedback.

Figure 6:
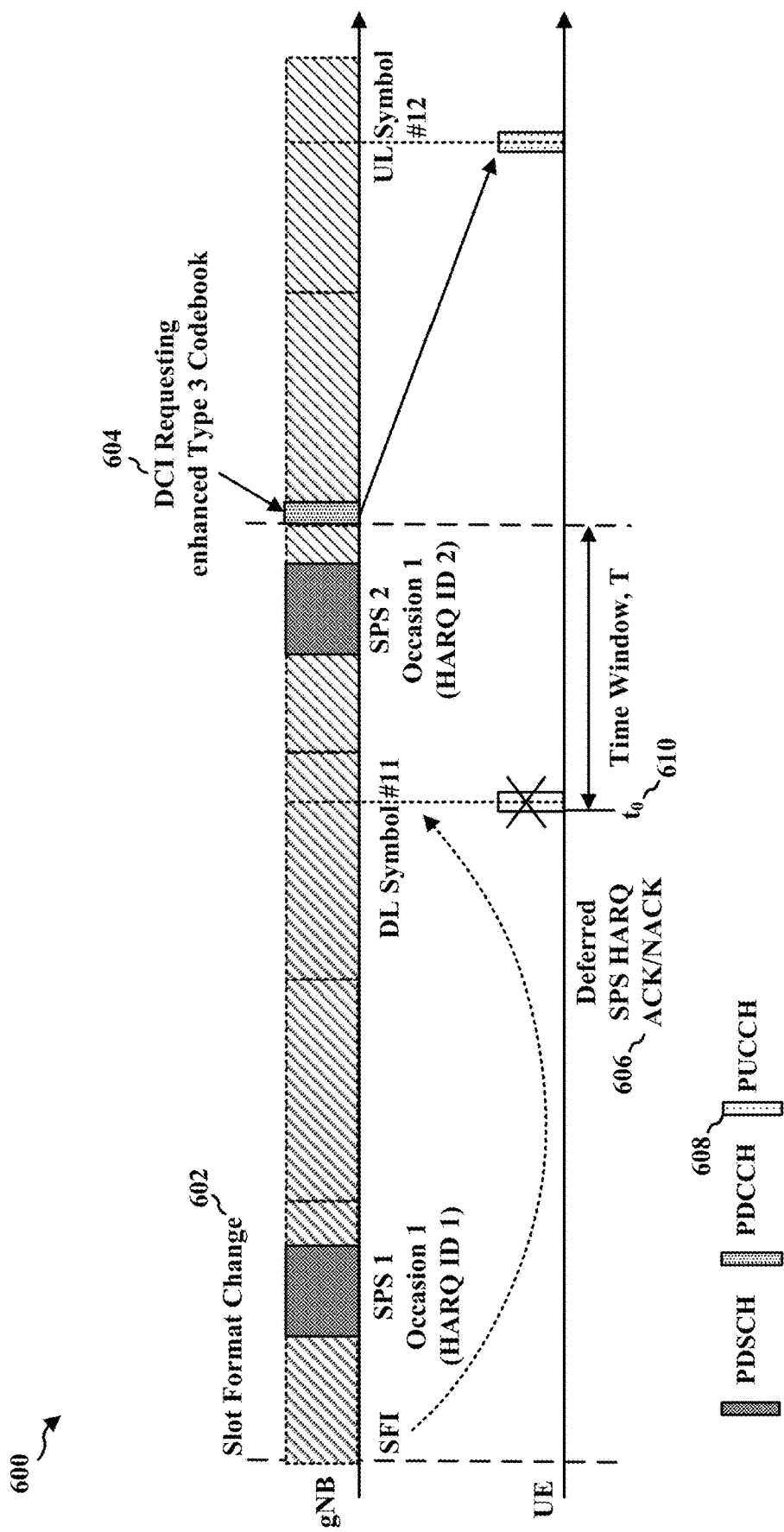
FIG. 6 is a diagram associated with an enhanced Type 3 codebook for SPS PUCCH HARQ-ACK.

FIG. 6 is a diagram 600 associated with an enhanced Type 3 codebook for SPS PUCCH HARQ-ACK. A slot format change 602 may impact transmissions from a plurality of UEs. Thus, based on the slot format change 602, a DCI 604 may be transmitted to the UE to request feedback via an enhanced Type 3 codebook. Type 3 codebooks may be used for unlicensed frequency bands. For example, in NR-unlicensed (NR-U) frequency bands there is no guarantee that a particular channel is going to be available for a UE, especially for HARQ reporting by the UE. Even if a message is received in DL, there is still no guarantee that resources will be available for the UE to transmit feedback in UL. Hence, the UE may support at least one enhanced Type 3 HARQ-ACK codebook, which may be smaller in size in comparison to other Type 3 HARQ-ACK codebooks (e.g., non-enhanced Type 3 codebooks). The codebook size of a single enhanced Type 3 HARQ-ACK codebook triggered at the UE may be at least determined based on an RRC configuration.

A codebook generated based on enhanced Type 3 may correspond to a plurality of HARQ processes. For example, the enhanced Type 3 codebook may be arranged according to HARQ identifiers (IDs) and/or serving cells. In an example, the network may request a transmission of 24 bits from the UE, which may correspond to 24 different instances of HARQ feedback for a same HARQ process or different HARQ processes. The network may indicate a slot format for the UE to utilize and the resources on which the UE may report the HARQ feedback. The HARQ feedback from the UE to the network may be regarded as grouped feedback for cases when the network is unable to receive HARQ feedback at every HARQ instance.

For deferred SPS HARQ ACK/NACK 606, the network may transmit DCI 604 to the UE to request a plurality of HARQ feedback bits from the UE, the transmission of which may be impacted by the slot format change 602 from the first slot format to the second slot format. The DCI 604 transmitted to the UE to request the HARQ feedback via the enhanced Type 3 codebook may, in some configurations, correspond to a new type of DCI. The base station may indicate, via the DCI 604, PUCCH resources 608 for transmitting the HARQ feedback. In some configurations, the PUCCH resources 608 may be staggered across different UEs when the slot format change 602 impacts the UL transmissions of different UEs.

In order to reduce layer 1 (L1) signaling overhead, the enhanced Type 3 codebook may correspond to a number N of SPS HARQ IDs for SPS HARQ occasions. The number N may be indicative of the codebook size. The base station may provide an explicit indication in the DCI 604 for requesting the first N SPS PUCCH HARQ-ACK. The base station may also indicate a location of the PUCCH resources. Since the transmission may be limited to SPS PUCCH HARQ-ACK, a reduction in payload size may be provided in comparison to other types of codebook transmissions. The first N SPS HARQ IDs after a time instance to 610 may be indicated by the DCI 604 for requesting feedback based on the enhanced Type 3 codebook. Feedback for the number N of SPS HARQ occasions may be requested to ensure that the UE and the base station have a same understanding of the codebook size.

Figure 7:
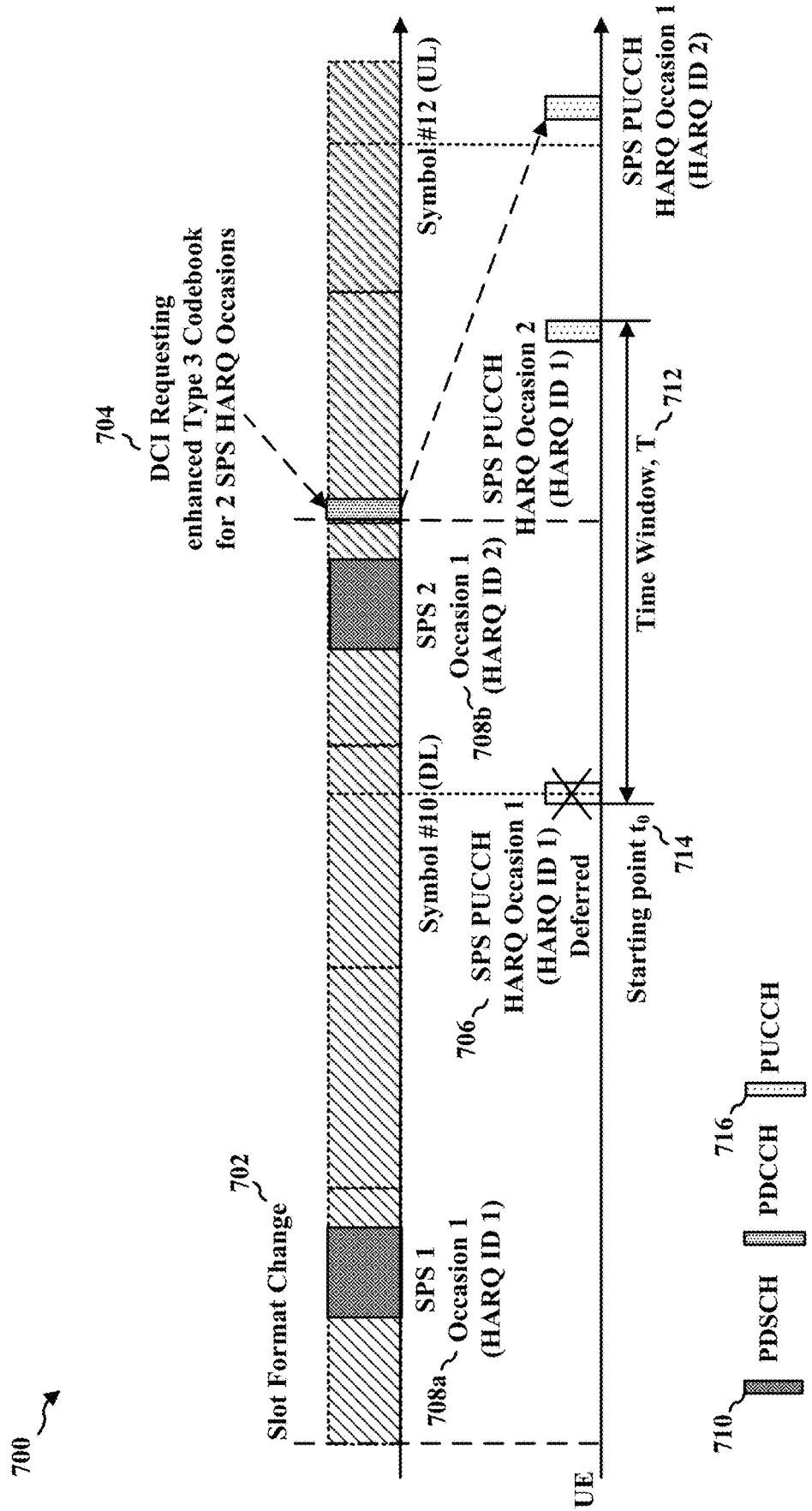
FIG. 7 is a diagram associated with downlink control information (DCI) for requesting an enhanced Type 3 codebook indicative of deferred SPS PUCCH HARQ-ACK and/or cancelled SPS PUCCH HARQ-ACK.

FIG. 7 is a diagram 700 associated with a DCI 704 for requesting an enhanced Type 3 codebook indicative of deferred SPS PUCCH HARQ-ACK 706 and/or cancelled SPS PUCCH HARQ-ACK. Two SPS configurations may include SPS1 occasion 1 708a associated with HARQ ID 1 and SPS2 occasion 1 708b associated with HARQ ID 2, which correspond to the first occasions of each of two different SPS configurations. After the slot format change 702 from the first slot format to the second slot format, HARQ feedback corresponding to SPS1 may be deferred. The network may indicate 2 SPS HARQ-ACK bits in the DCI 704, where the DCI 704 may include a bit indicative of a request for the deferred SPS PUCCH HARQ-ACK 706 or a bit indicative of cancelled SPS PUCCH HARQ-ACK (e.g., for SPS or for a dedicated grant of PDSCH resources 710).

The network may request a number N of HARQ codebook bits to be reported by the UE. In examples, the number N may be N=1 to 12, and may be smaller than a number M used for other Type 3 codebooks (e.g., M=16). If the number N is greater than 12, then there would be more than 12 deferred SPS PUCCH HARQ-ACK feedback occasions, which may have an impact on a performance of the UE and/or the network.

To report feedback for a plurality of SPS PUCCH HARQ-ACK occasions, the UE may determine a time window 712 that begins at a reference time $T_0$ 714, where $T_0$ 714 may explicitly indicate a starting number of a sub-slot or slot, e.g., in cases where the slot format change 702 is based on SF1. For example, the reference time $T_0$ 714 may indicate sub-slot 5 of slot 3 as the starting sub-slot number. In further examples, the reference time $T_0$ 714 may be indicative of the sub-slot or slot number of a first/earliest occasion for the deferred SPS PUCCH HARQ-ACK 706, e.g., in cases where the UE is aware of the slot format change 702/collision with a DL symbol. The slot format change 702 may be performed at the RRC level, or the slot format change 702 may be performed via SFI when the SFI is received by the UE. The time window 712 that begins at the reference time $T_0$ 714 may not exceed an SPS cycle, e.g., of an IIoT device. If a packet is transmitted at SPS1 occasion 1 708a and the packet expires after 4 slots, resources may be wasted if the network attempts to request feedback beyond the 4 slots for a packet that has already expired.

The DCI format may be either UE-specific or group DCI. If a single UE is impacted by the slot format change 702, the DCI 704 may correspond to the UE-specific DCI. DCI 1_1 may be utilized to request HARQ feedback based on an enhanced Type 3 codebook. For example, DCI 1_1 may be used for granting DL resources and for requesting UE-specific UL feedback. If a plurality of UEs are impacted by the slot format change 702, group DCI may be transmitted to reduce overhead.

A PUCCH resource indicator for the enhanced Type 3 HARQ codebook may also be indicated via DCI 704. The UE may perform dynamic resource selection based on an indication in the triggering DCI 704 for one or more enhanced Type 3 HARQ codebooks. Each of the one or more enhanced Type 3 HARQ codebooks may be indicated via RRC configuration. DL HARQ processes may be associated with configured component carriers (CCs) in an enhanced Type 3 HARQ codebook. In examples, a plurality of CCs may be activated for one or more UEs of a cell, and a slot format change 702 may impact the plurality of CCs. Transmitted content/information may be per CC impacted by the slot format change 702. For instance, if the slot format change 702 impacts 2 CCs, then N bits may be determined per CC. That is, the same information may be indicated for additional CCs that are impacted by the slot format change 702.

The UE may also support one-shot triggering (e.g., via DL assignment) of HARQ-ACK retransmission on a PUCCH resource 716 that does not correspond to an enhanced Type 2 HARQ-ACK codebook or an enhanced Type 3 HARQ-ACK codebook. Enhanced Type 3 HARQ-ACK codebooks and/or one-shot triggering (e.g., via DL assignment) of HARQ-ACK retransmission may be based on separate UE capabilities. If the UE receives a request for one-shot feedback, the UE may determine HARQ-ACK information bits for the enhanced Type 3 HARQ-ACK codebook. A DCI format may be used to schedule a reception on PDSCH resources 710 and trigger the enhanced Type 3 HARQ-ACK codebook on PUCCH resources 716, which may be associated with an index field. The UE may determine a number of serving cells and a number of indicated HARQ processes for each indicated serving cell. If the DCI format does not include the index field, the UE may determine that the index field has a value of 0.

In further examples, the network may determine to cancel HARQ feedback from the UE based on different priorities for different types of traffic supported by the UE, or based on a high priority traffic indication from another UE. In cases where the network requests that some of the HARQ feedback from the UE be cancelled, the UE may report a number N of HARQ bits. However, the number N should correspond to the HARQ processes for both SPS traffic and non-SPS traffic (e.g., dedicated grant traffic). An extra bit in the DCI 704 may be used to differentiate between SPS traffic and non-SPS traffic. If the UE has not been requested to cancel the HARQ feedback, the UE may report feedback for the deferred SPS PUCCH HARQ-ACK 706. In cases of either deferred SPS PUCCH HARQ-ACK 706 or cancelled SPS PUCCH HARQ-ACK, the network may indicate to the UE if an enhanced Type 3 HARQ codebook is associated with HARQ bits that correspond to solely SPS traffic. If so, the indication may be provided by a first bit of the DCI 704.

The enhanced Type 3 codebook may include a bit indicative of a response to a request for either the deferred SPS PUCCH HARQ-ACK 706 or the cancelled SPS PUCCH HARQ-ACK. After the slot format change 702 and the deferred SPS PUCCH HARQ-ACK 706, a cancellation indication message may not be provided for adjusting SPS PUCCH HARQ-ACKs. The enhanced Type 3 codebook may include a number N of HARQ codebook bits. The number N may be based on at least one of a DL packet expiration time, an IIoT periodicity, or a number of SPS configurations. If the packet expires after 1 ms, the time window 712 (T) may have a maximum duration of 1 ms. The diagram 700 illustrates 2 SPS occasions, which may correspond to the number N=2. If 3 SPS occasions are indicated, the number N would be equal to 3.

Figure 8:
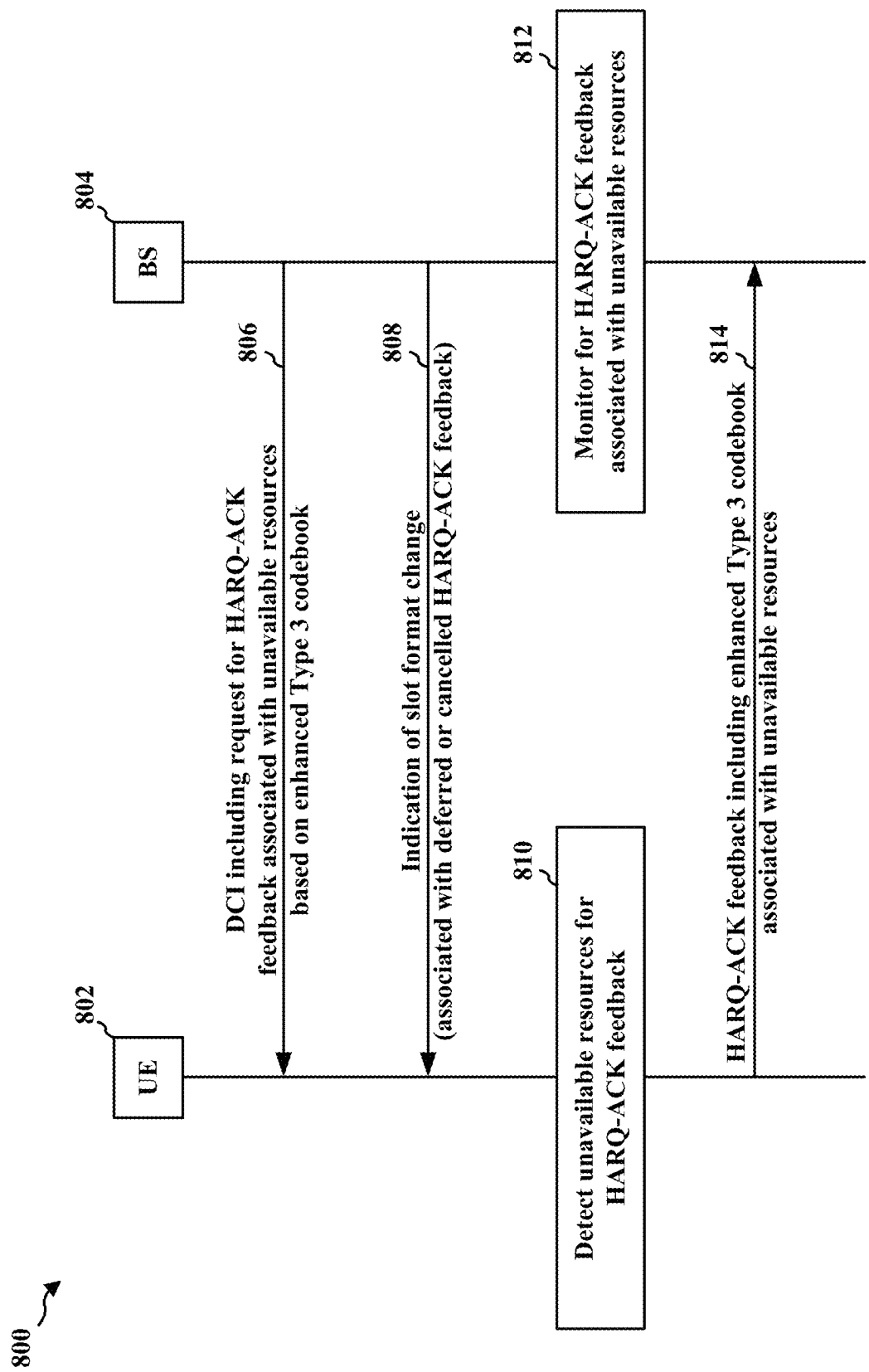
FIG. 8 is a call flow diagram illustrating communications between a UE and a base station.

FIG. 8 is a call flow diagram 800 illustrating communications between a UE 802 and a base station 804. At 806, the base station 804 may transmit DCI to the UE 802. The DCI may include a request for HARQ-ACK feedback from the UE 802, where the HARQ-ACK feedback may be associated with unavailable resources (e.g., a HARQ ACK/NACK collision with a DL symbol). The DCI including the request for the HARQ-ACK feedback may indicate the unavailable resources to the UE 802. The HARQ-ACK feedback from the UE 802 may correspond to a one-shot HARQ-ACK codebook (e.g., enhanced Type 3 codebook) including one or more bits indicative of deferred SPS PUCCH HARQ-ACK.

At 808, the base station 804 may transmit an indication of a slot forma change. For example, the slot format may be switched from a first slot format, such as Slot Format 42, to a second slot format, such as Slot Format 33. In a first example, the indication of the slot format change may be associated with deferred HARQ-ACK feedback based on an ACK/NACK collision with a DL symbol. In a second example, the indication of the slot format change may be associated with cancelled HARQ-ACK feedback based on the ACK/NACK collision with the DL symbol. Thus, the UE 802 may transmit the HARQ-ACK feedback to the base station 804 when the HARQ-ACK feedback is deferred, but may refrain from transmitting the HARQ-ACK feedback to the base station 804 when the HARQ-ACK feedback is cancelled.

At 810, the UE 802 may detect the unavailable resources associated with the HARQ-ACK feedback. For example, the unavailable resources may be detected by the UE 802 based on the indication of the slot format change received from the base station 804. For instance, the UE 802 may determine that one or more ACK/NACK feedback occasions collide with one or more DL symbols based on the switched/changed slot format.

At 812, the base station 804 may monitor for HARQ-ACK feedback from the UE 802, where the HARQ-ACK feedback is associated with the unavailable resources. In examples, the HARQ-ACK feedback may be included in a one-shot HARQ-ACK codebook (e.g., an enhanced Type 3 codebook). At 814, the UE 802 may transmit, to the base station 804, the HARQ-ACK feedback associated with the unavailable resources, which may include the enhanced Type 3 codebook.

Figure 9:
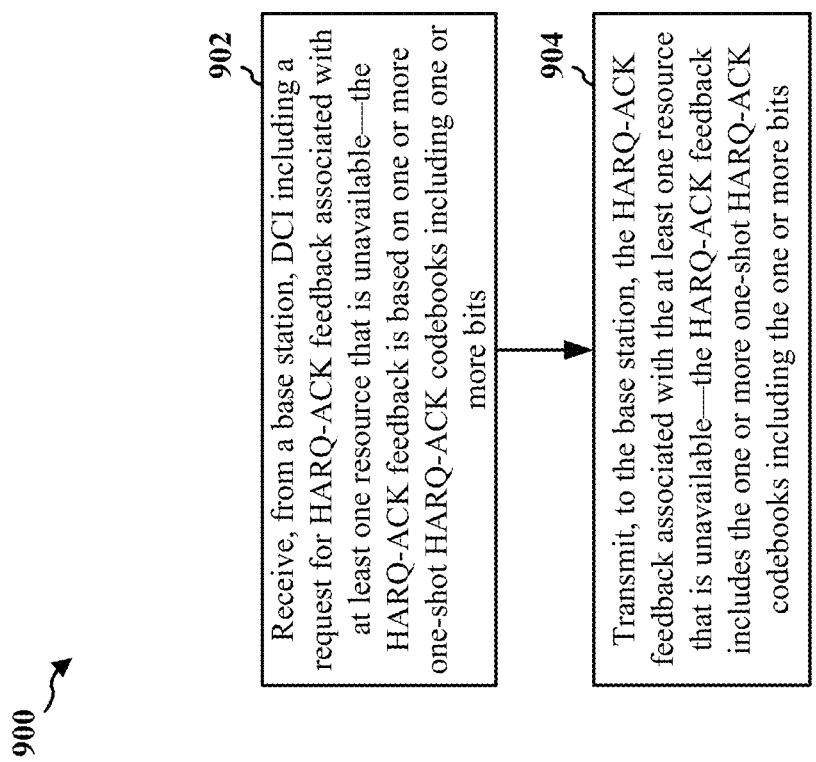
FIG. 9 is a flowchart of a method of wireless communication at a UE.

FIG. 9 is a flowchart 900 of a method of wireless communication. The method may be performed by a UE (e.g., the UE 104/802; the apparatus 1302; etc.), which may include the memory 360 and which may be the entire UE 104/802 or a component of the UE 104/802, such as the TX processor 368, the RX processor 356, and/or the controller/processor 359.

At 902, the UE may receive, from a base station, DCI including a request for HARQ-ACK feedback associated with at least one resource that is unavailable—the HARQ-ACK feedback is based on one or more one-shot HARQ-ACK codebooks including one or more bits. For example, referring to FIG. 8, the UE 802 may receive, at 806, from the base station 804, DCI including a request for HARQ-ACK feedback associated with unavailable resources, where the HARQ-ACK feedback is based on an enhanced Type 3 codebook. The reception, at 902, may be performed by the reception component 1330 of the apparatus 1302 in FIG. 13.

At 904, the UE may transmit, to the base station, the HARQ-ACK feedback associated with the at least one resource that is unavailable—the HARQ-ACK feedback includes the one or more one-shot HARQ-ACK codebooks including the one or more bits. For example, referring to FIG. 8, the UE 802 may transmit, at 814, to the base station 804, the HARQ-ACK feedback including the enhanced Type 3 HARQ-ACK codebook associated with the unavailable resources. The transmission, at 904, may be performed by the transmission component 1334 of the apparatus 1302 in FIG. 13.

Figure 10:
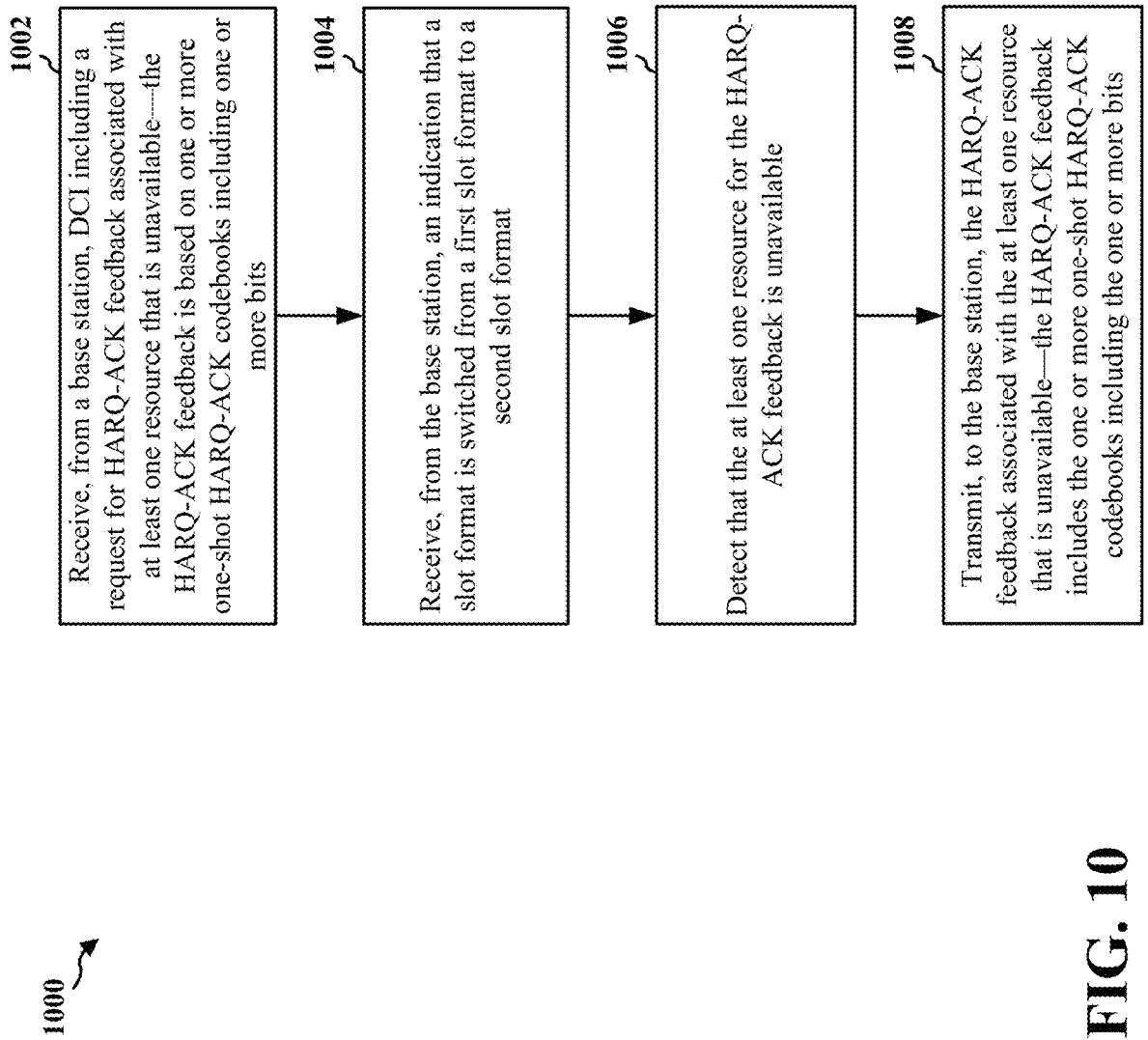
FIG. 10 is a flowchart of a method of wireless communication at a UE.

FIG. 10 is a flowchart 1000 of a method of wireless communication. The method may be performed by a UE (e.g., the UE 104/802; the apparatus 1302; etc.), which may include the memory 360 and which may be the entire UE 104/802 or a component of the UE 104/802, such as the TX processor 368, the RX processor 356, and/or the controller/processor 359.

At 1002, the UE may receive, from a base station, DCI including a request for HARQ-ACK feedback associated with at least one resource that is unavailable—the HARQ-ACK feedback is based on one or more one-shot HARQ-ACK codebooks including one or more bits. For example, referring to FIG. 8, the UE 802 may receive, at 806, from the base station 804, DCI including a request for HARQ-ACK feedback associated with unavailable resources, where the HARQ-ACK feedback is based on an enhanced Type 3 codebook. The reception, at 1002, may be performed by the reception component 1330 of the apparatus 1302 in FIG. 13.

At 1004, the UE may receive, from the base station, an indication that a slot format is switched from a first slot format to a second slot format. For example, referring to FIG. 8, the UE 802 may receive, at 808, an indication of a slot format change from the base station 804. The reception, at 1004, may be performed by the reception component 1330 of the apparatus 1302 in FIG. 13.

At 1006, the UE may detect that the at least one resource for the HARQ-ACK feedback is unavailable. For example, referring to FIG. 8, the UE 802 may detect, at 810, unavailable resources for transmitting HARQ-ACK feedback to the base station 804. The detection, at 1006, may be performed by the detection component 1340 of the apparatus 1302 in FIG. 13.

At 1008, the UE may transmit, to the base station, the HARQ-ACK feedback associated with the at least one resource that is unavailable—the HARQ-ACK feedback includes the one or more one-shot HARQ-ACK codebooks including the one or more bits. For example, referring to FIG. 8, the UE 802 may transmit, at 814, to the base station 804, the HARQ-ACK feedback including the enhanced Type 3 HARQ-ACK codebook associated with the unavailable resources. The transmission, at 1008, may be performed by the transmission component 1334 of the apparatus 1302 in FIG. 13.

Figure 11:
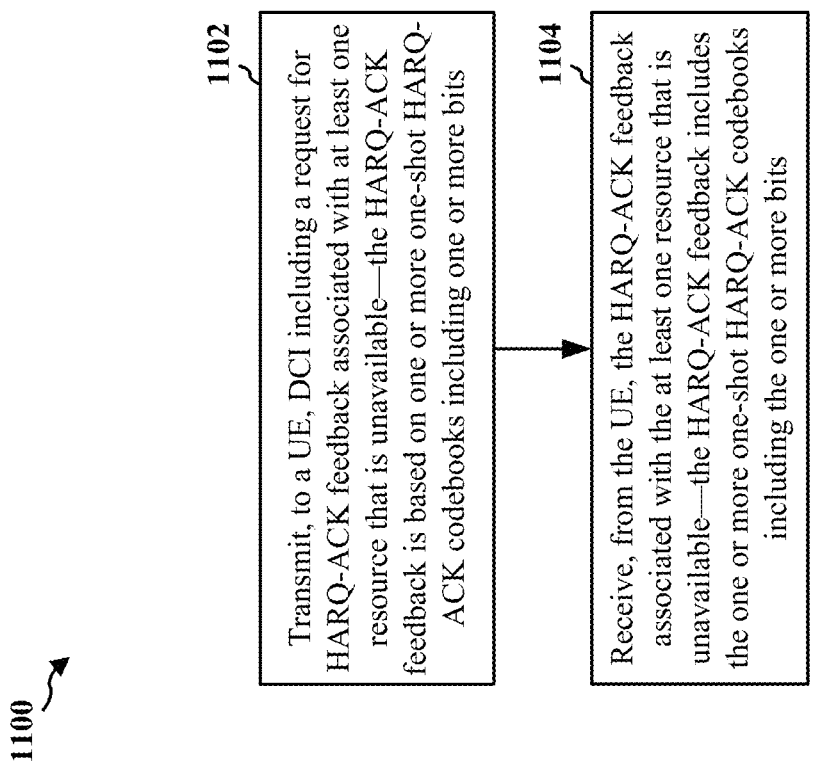
FIG. 11 is a flowchart of a method of wireless communication at a base station.

FIG. 11 is a flowchart 1100 of a method of wireless communication. The method may be performed by a base station (e.g., the base station 102/804; the apparatus 1402; etc.), which may include the memory 376 and which may be the entire base station 102/804 or a component of the base station 102/804, such as the TX processor 316, the RX processor 370, and/or the controller/processor 375.

At 1102, the base station may transmit, to a UE, DCI including a request for HARQ-ACK feedback associated with at least one resource that is unavailable—the HARQ-ACK feedback is based on one or more one-shot HARQ-ACK codebooks including one or more bits. For example, referring to FIG. 8, the base station 804 may transmit, at 806, to the UE 802, DCI including a request for HARQ-ACK feedback associated with unavailable resources, where the HARQ-ACK feedback is based on an enhanced Type 3 codebook. The transmission, at 1102, may be performed by the transmission component 1434 of the apparatus 1402 in FIG. 14.

At 1104, the base station may receive, from the UE, the HARQ-ACK feedback associated with the at least one resource that is unavailable—the HARQ-ACK feedback includes the one or more one-shot HARQ-ACK codebooks including the one or more bits. For example, referring to FIG. 8, the base station 804 may receive, at 814, from the UE 802, the HARQ-ACK feedback including the enhanced Type 3 HARQ-ACK codebook associated with the unavailable resources. The reception, at 1104, may be performed by the reception component 1430 of the apparatus 1402 in FIG. 14.

Figure 12:
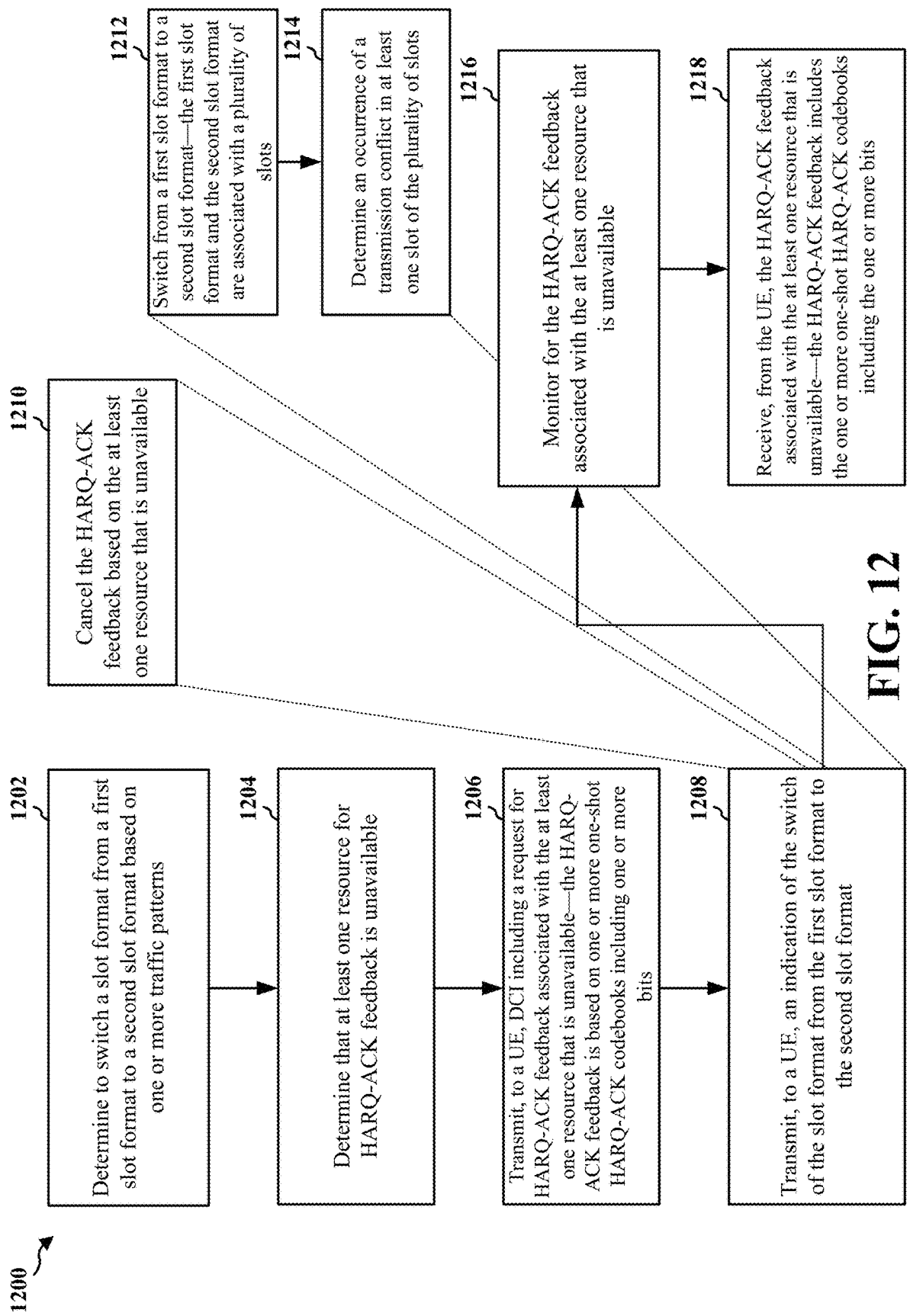
FIG. 12 is a flowchart of a method of wireless communication at a base station.

FIG. 12 is a flowchart 1200 of a method of wireless communication. The method may be performed by a base station (e.g., the base station 102/804; the apparatus 1402; etc.), which may include the memory 376 and which may be the entire base station 102/804 or a component of the base station 102/804, such as the TX processor 316, the RX processor 370, and/or the controller/processor 375.

At 1202, the base station may determine to switch a slot format from a first slot format to a second slot format based on one or more traffic patterns. For example, referring to FIG. 4, the base station may determine to switch from Slot Format 42, which may be associated with an UL-heavy traffic pattern, to Slot Format 33, which may be associated with a DL-heavy traffic pattern. The determination, at 1202, may be performed by the determination component 1440 of the apparatus 1402 in FIG. 14.

At 1204, the base station may determine that at least one resource for HARQ-ACK feedback is unavailable. For example, referring to FIGS. 4-5, the base station may determine a HARQ ACK/NACK collision with a DL symbol. Referring to FIGS. 6-7, the HARQ ACK/NACK may be deferred at time $t_0$. The determination, at 1204, may be performed by the determination component 1440 of the apparatus 1402 in FIG. 14.

At 1206, the base station may transmit, to a UE, DCI including a request for HARQ-ACK feedback associated with the at least one resource that is unavailable—the HARQ-ACK feedback is based on one or more one-shot HARQ-ACK codebooks including one or more bits. For example, referring to FIG. 8, the base station 804 may transmit, at 806, to the UE 802, DCI including a request for HARQ-ACK feedback associated with unavailable resources, where the HARQ-ACK feedback is based on an enhanced Type 3 codebook. The transmission, at 1206, may be performed by the transmission component 1434 of the apparatus 1402 in FIG. 14.

At 1208, the base station may transmit, to a UE, an indication of the switch of the slot format from the first slot format to the second slot format. For example, referring to FIG. 8, the base station 804 may transmit, at 808, an indication of a slot format change from the UE 802. The transmission, at 1208, may be performed by the transmission component 1434 of the apparatus 1402 in FIG. 14.

At 1210, the base station may cancel the HARQ-ACK feedback based on the at least one resource that is unavailable. For example, referring to FIG. 8, the indication, at 808, of the slot format change may be associated deferred or cancelled HARQ-ACK feedback. The cancellation, at 1210, may be performed by the cancellation component 1442 of the apparatus 1402 in FIG. 14.

At 1212, the base station may switch from a first slot format to a second slot format—the first slot format and the second slot format are associated with a plurality of slots. For example, referring to FIG. 4, the base station may switch from Slot Format 42 to Slot Format 33, which may be associated with a plurality of slots. The switching, at 1212, may be performed by the switcher component 1444 of the apparatus 1402 in FIG. 14.

At 1214, the base station may determine an occurrence of a transmission conflict in at least one slot of the plurality of slots. For example, referring to FIGS. 4-5, the base station may determine a HARQ ACK/NACK collision with a DL symbol. The determination, at 1214, may be performed by the determination component 1440 of the apparatus 1402 in FIG. 14.

At 1216, the base station may monitor for the HARQ-ACK feedback associated with the at least one resource that is unavailable. For example, referring to FIG. 8, the base station 804 may monitor, at 812, for HARQ-ACK feedback associated with unavailable resources. The monitoring, at 1216, may be performed by the monitor component 1446 of the apparatus 1402 in FIG. 14.

At 1218, the base station may receive, from the UE, the HARQ-ACK feedback associated with the at least one resource that is unavailable—the HARQ-ACK feedback includes the one or more one-shot HARQ-ACK codebooks including the one or more bits. For example, referring to FIG. 8, the base station 804 may receive, at 814, from the UE 802, the HARQ-ACK feedback including the enhanced Type 3 HARQ-ACK codebook associated with the unavailable resources. The reception, at 1218, may be performed by the reception component 1430 of the apparatus 1402 in FIG. 14.

Figure 13:
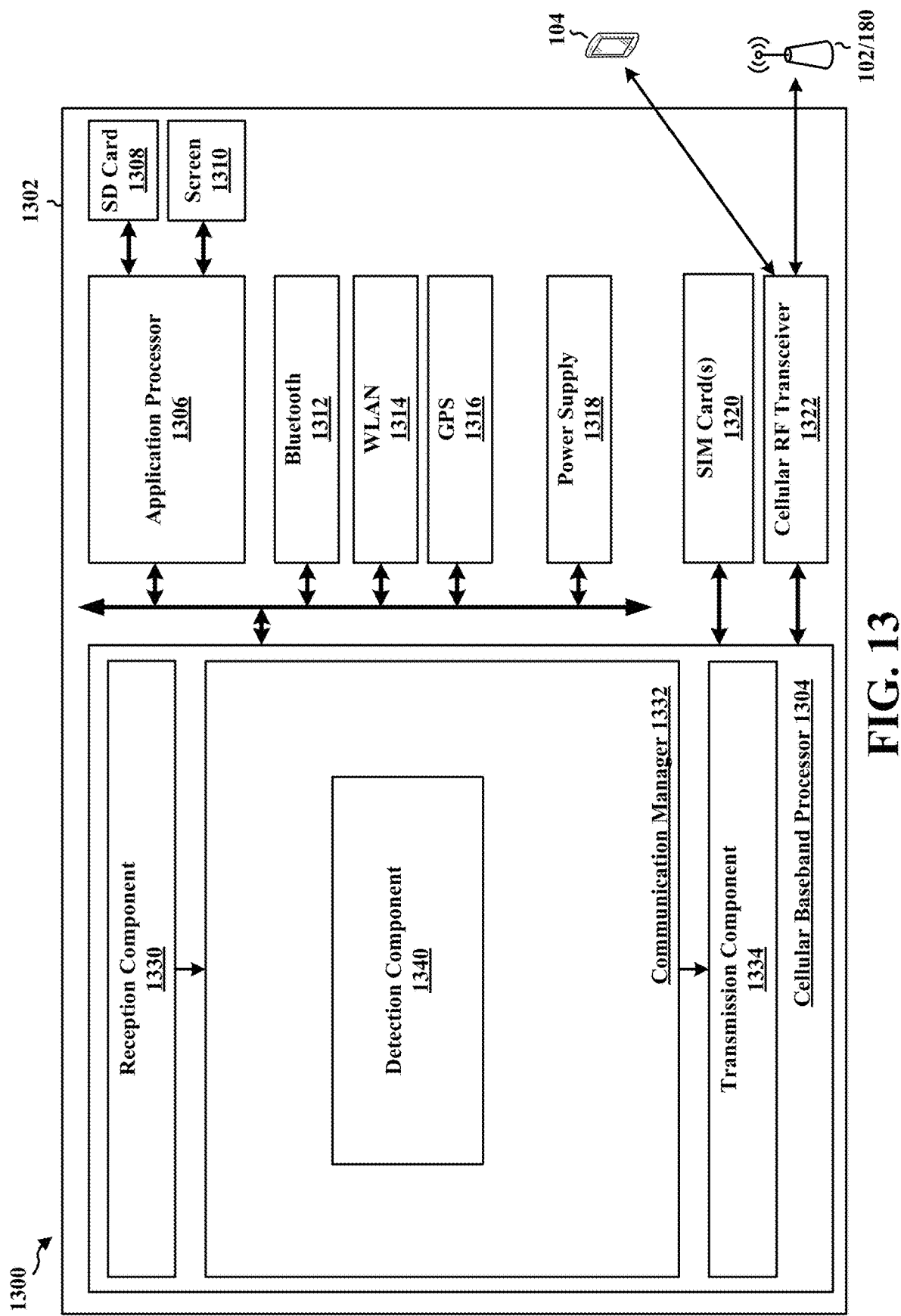
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory.

The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The reception component 1330 is configured, e.g., as described in connection with 902, 1002, and 1004, to receive, from a base station, DCI including a request for HARQ-ACK feedback associated with at least one resource that is unavailable—the HARQ-ACK feedback is based on one or more one-shot HARQ-ACK codebooks including one or more bits; and to receive, from the base station, an indication that a slot format is switched from a first slot format to a second slot format. The communication manager 1332 includes a detection component 1340 that is configured, e.g., as described in connection with 1006, to detect that the at least one resource for the HARQ-ACK feedback is unavailable. The transmission component 1334 is configured, e.g., as described in connection with 904 and 1008, to transmit, to the base station, the HARQ-ACK feedback associated with the at least one resource that is unavailable—the HARQ-ACK feedback includes the one or more one-shot HARQ-ACK codebooks including the one or more bits.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, DCI including a request for HARQ-ACK feedback associated with at least one resource that is unavailable, the HARQ-ACK feedback including one or more one-shot HARQ-ACK codebooks including one or more bits; and means for transmitting, to the base station, the HARQ-ACK feedback associated with the at least one resource that is unavailable, the HARQ-ACK feedback including the one or more one-shot HARQ-ACK codebooks including the one or more bits. The apparatus 1302 further includes means for receiving, from the base station, an indication of the switch of the slot format from the first slot format to the second slot format. The apparatus 1302 further includes means for detecting that the at least one resource for the HARQ-ACK feedback is unavailable.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
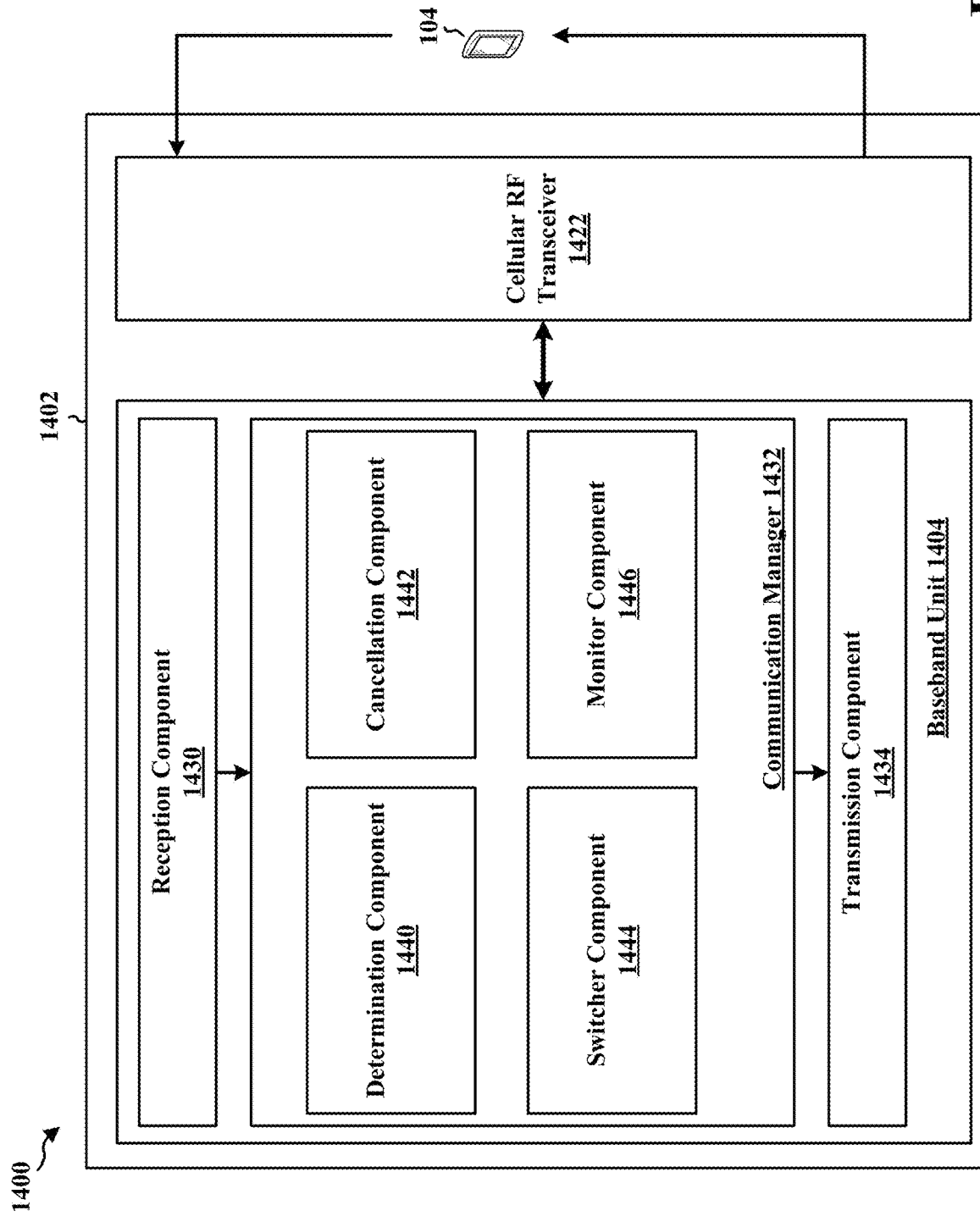
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a determination component 1440 that is configured, e.g., as described in connection with 1202, 1204, and 1214, to determine to switch a slot format from a first slot format to a second slot format based on one or more traffic patterns; to determine that at least one resource for HARQ-ACK feedback is unavailable; and to determine an occurrence of a transmission conflict in at least one slot of the plurality of slots. The communication manager 1432 further includes a cancellation component 1442 that is configured, e.g., as described in connection with 1210, to cancel the HARQ-ACK feedback based on the at least one resource that is unavailable. The communication manager 1432 further includes a switcher component 1444 that is configured, e.g., as described in connection with 1212, to switch from a first slot format to a second slot format—the first slot format and the second slot format are associated with a plurality of slots. The communication manager 1432 further includes a monitor component 1446 that is configured, e.g., as described in connection with 1216, to monitor for the HARQ-ACK feedback associated with the at least one resource that is unavailable.

The reception component 1430 is configured, e.g., as described in connection with 1104 and 1218, to receive, from the UE, the HARQ-ACK feedback associated with the at least one resource that is unavailable—the HARQ-ACK feedback includes the one or more one-shot HARQ-ACK codebooks including the one or more bits. The transmission component 1434 is configured, e.g., as described in connection with 1102, 1206, and 1208, to transmit, to a UE, DCI including a request for HARQ-ACK feedback associated with the at least one resource that is unavailable—the HARQ-ACK feedback is based on one or more one-shot HARQ-ACK codebooks including one or more bits; and to transmit, to a UE, an indication of the switch of the slot format from the first slot format to the second slot format.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting, to a UE, DCI including a request for HARQ-ACK feedback associated with at least one resource that is unavailable, the HARQ-ACK feedback based on one or more one-shot HARQ-ACK codebooks including one or more bits; and receiving, from the UE, the HARQ-ACK feedback associated with the at least one resource that is unavailable, the HARQ-ACK feedback including the one or more one-shot HARQ-ACK codebooks including the one or more bits. The apparatus 1402 further includes means for switching a slot format from a first slot format to a second slot format, the first slot format and the second slot format being associated with a plurality of slots, an occurrence of a transmission conflict included in at least one slot of the plurality of slots. The apparatus 1402 further includes means for transmitting, to the UE, an indication of the switch of the slot format from the first slot format to the second slot format. The apparatus 1402 further includes means for cancelling the HARQ-ACK feedback based on the at least one resource that is unavailable. The apparatus 1402 further includes means for monitoring for the HARQ-ACK feedback associated with the at least one resource that is unavailable.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, DCI including a request for HARQ-ACK feedback associated with at least one resource that is unavailable, the HARQ-ACK feedback based on one or more one-shot HARQ-ACK codebooks including one or more bits; and transmit, to the base station, the HARQ-ACK feedback associated with the at least one resource that is unavailable, the HARQ-ACK feedback including the one or more one-shot HARQ-ACK codebooks including the one or more bits.

Aspect 2 may be combined with aspect 1 and includes that the at least one resource that is unavailable is indicated in the DCI including the request for the HARQ-ACK feedback.

Aspect 3 may be combined with any of aspects 1-2 and includes that the DCI includes an indication of one or more HARQ processes for one or more serving cells associated with the at least one resource that is unavailable.

Aspect 4 may be combined with any of aspects 1-3 and includes that the DCI is received based on a slot format being switched from a first slot format to a second slot format, the first slot format and the second slot format associated with a plurality of slots, an occurrence of a transmission conflict included in at least one slot of the plurality of slots.

Aspect 5 may be combined with any of aspects 1-4 and includes that the request for the HARQ-ACK feedback is received per CC when the switch of the slot format from the first slot format to the second slot format causes the transmission conflict to occur on more than one CC.

Aspect 6 may be combined with any of aspects 1-5 and includes that the HARQ-ACK feedback corresponds to an instance of HARQ-ACK feedback that occurs after the switch of the slot format from the first slot format to the second slot format.

Aspect 7 may be combined with any of aspects 1-6 and includes that the at least one processor is further configured to receive, from the base station, an indication of the switch of the slot format from the first slot format to the second slot format.

Aspect 8 may be combined with any of aspects 1-7 and includes that the at least one processor is further configured to detect that the at least one resource for the HARQ-ACK feedback is unavailable.

Aspect 9 may be combined with any of aspects 1-8 and includes that detecting that the at least one resource for the HARQ-ACK feedback is unavailable is associated with a transmission conflict in at least one slot of a plurality of slots, the plurality of slots associated with a slot format.

Aspect 10 may be combined with any of aspects 1-9 and includes that the HARQ-ACK feedback corresponds to SPS PUCCH HARQ.

Aspect 11 may be combined with any of aspects 1-10 and includes that the one or more one-shot HARQ-ACK codebooks correspond to one or more enhanced Type 3 HARQ-ACK codebooks.

Aspect 12 may be combined with any of aspects 1-11 and includes that the DCI includes an indication associated with a particular bit, the particular bit indicative of whether the request is for deferred SPS PUCCH HARQ or for cancelled HARQ-ACK feedback, where the request is transmitted when the HARQ-ACK feedback is not cancelled.

Aspect 13 is an apparatus for wireless communication at a base station including at least one processor coupled to a memory and configured to transmit, to a UE, DCI including a request for HARQ-ACK feedback associated with at least one resource that is unavailable, the HARQ-ACK feedback based on one or more one-shot HARQ-ACK codebooks including one or more bits; and receive, from the UE, the HARQ-ACK feedback associated with the at least one resource that is unavailable, the HARQ-ACK feedback including the one or more one-shot HARQ-ACK codebooks including the one or more bits.

Aspect 14 may be combined with aspect 13 and includes that the at least one resource that is unavailable is indicated in the DCI including the request for the HARQ-ACK feedback.

Aspect 15 may be combined with any of aspects 13-14 and includes that the DCI includes an indication of one or more HARQ processes for one or more serving cells associated with the at least one resource that is unavailable.

Aspect 16 may be combined with any of aspects 13-15 and includes that the at least one processor is further configured to switch a slot format from a first slot format to a second slot format, the first slot format and the second slot format being associated with a plurality of slots, an occurrence of a transmission conflict included in at least one slot of the plurality of slots.

Aspect 17 may be combined with any of aspects 13-16 and includes that the request for the HARQ-ACK feedback is transmitted per CC when the switch of the slot format from the first slot format to the second slot format causes the transmission conflict to occur on more than one CC.

Aspect 18 may be combined with any of aspects 13-17 and includes that the HARQ-ACK feedback corresponds to an instance of HARQ-ACK feedback that occurs after the switch of the slot format from the first slot format to the second slot format.

Aspect 19 may be combined with any of aspects 13-18 and includes that the switch of the slot format from the first slot format to the second slot format is based on one or more traffic patterns.

Aspect 20 may be combined with any of aspects 13-19 and includes that the at least one processor is further configured to transmit, to the UE, an indication of the switch of the slot format from the first slot format to the second slot format.

Aspect 21 may be combined with any of aspects 13-20 and includes that the at least one processor is further configured to cancel the HARQ-ACK feedback based on the at least one resource that is unavailable.

Aspect 22 may be combined with any of aspects 13-21 and includes that the HARQ-ACK feedback corresponds to SPS PUCCH HARQ.

Aspect 23 may be combined with any of aspects 13-22 and includes that the one or more one-shot HARQ-ACK codebooks correspond to one or more enhanced Type 3 HARQ-ACK codebooks.

Aspect 24 may be combined with any of aspects 13-23 and includes that the at least one processor is further configured to monitor for the HARQ-ACK feedback associated with the at least one resource that is unavailable.

Aspect 25 may be combined with any of aspects 13-24 and includes that the DCI includes an indication associated with a particular bit, the particular bit indicative of whether the request is for deferred SPS PUCCH HARQ or for cancelled HARQ-ACK feedback, where the request is received when the HARQ-ACK feedback is not cancelled.

Aspect 26 may be combined with any of aspects 1-25 and further includes at least one of an antenna or a transceiver coupled to the at least one processor.

Aspect 27 is a method of wireless communication for implementing any of aspects 1-26.

Aspect 28 is an apparatus for wireless communication including means for implementing any of aspects 1-26.

Aspect 29 is a non-transitory computer-readable medium storing computer executable code, the code when executed by at least one processor causes the at least one processor to implement any of aspects 1-26.

What is claimed is:

1. An apparatus for wireless communication at a user equipment (UE), comprising:
a memory; and
at least one processor coupled to the memory and configured to:
receive, from a base station, downlink control information (DCI) including a request for hybrid automatic repeat request (HARQ)-acknowledgment (ACK) (HARQ-ACK) feedback associated with at least one resource that is unavailable, the HARQ-ACK feedback based on one or more one-shot HARQ-ACK codebooks including one or more bits; and
transmit, to the base station, the HARQ-ACK feedback associated with the at least one resource that is unavailable, the HARQ-ACK feedback including the one or more one-shot HARQ-ACK codebooks including the one or more bits.

2. The apparatus of claim 1, wherein the at least one resource that is unavailable is indicated in the DCI including the request for the HARQ-ACK feedback.

3. The apparatus of claim 1, wherein the DCI includes an indication of one or more HARQ processes for one or more serving cells associated with the at least one resource that is unavailable.

4. The apparatus of claim 1, wherein the DCI is received based on a slot format being switched from a first slot format to a second slot format, the first slot format and the second slot format associated with a plurality of slots, an occurrence of a transmission conflict included in at least one slot of the plurality of slots.

5. The apparatus of claim 4, wherein the request for the HARQ-ACK feedback is received per component carrier (CC) when the switch of the slot format from the first slot format to the second slot format causes the transmission conflict to occur on more than one CC.

6. The apparatus of claim 4, wherein the HARQ-ACK feedback corresponds to an instance of HARQ-ACK feedback that occurs after the switch of the slot format from the first slot format to the second slot format.

7. The apparatus of claim 4, wherein the at least one processor is further configured to receive, from the base station, an indication of the switch of the slot format from the first slot format to the second slot format.

8. The apparatus of claim 1, wherein the at least one processor is further configured to detect that the at least one resource for the HARQ-ACK feedback is unavailable.

9. The apparatus of claim 8, wherein the detection that the at least one resource for the HARQ-ACK feedback is unavailable is associated with a transmission conflict in at least one slot of a plurality of slots, the plurality of slots associated with a slot format.

10. The apparatus of claim 1, wherein the HARQ-ACK feedback corresponds to semi-persistent scheduling (SPS) physical uplink control channel (PUCCH) HARQ.

11. The apparatus of claim 1, further comprising at least one of an antenna or a transceiver coupled to the at least one processor, wherein the one or more one-shot HARQ-ACK codebooks correspond to one or more enhanced Type 3 HARQ-ACK codebooks.

12. The apparatus of claim 1, wherein the DCI includes an indication associated with a particular bit, the particular bit indicative of whether the request is for deferred semi-persistent scheduling (SPS) physical uplink control channel (PUCCH) HARQ or for cancelled HARQ-ACK feedback, wherein the request is transmitted when the HARQ-ACK feedback is not cancelled.

13. An apparatus for wireless communication at a base station, comprising:
a memory; and
at least one processor coupled to the memory and configured to:
transmit, to a user equipment (UE), downlink control information (DCI) including a request for hybrid automatic repeat request (HARQ)-acknowledgment (ACK) (HARQ-ACK) feedback associated with at least one resource that is unavailable, the HARQ-ACK feedback based on one or more one-shot HARQ-ACK codebooks including one or more bits; and
receive, from the UE, the HARQ-ACK feedback associated with the at least one resource that is unavailable, the HARQ-ACK feedback including the one or more one-shot HARQ-ACK codebooks including the one or more bits.

14. The apparatus of claim 13, wherein the at least one resource that is unavailable is indicated in the DCI including the request for the HARQ-ACK feedback.

15. The apparatus of claim 13, wherein the DCI includes an indication of one or more HARQ processes for one or more serving cells associated with the at least one resource that is unavailable.

16. The apparatus of claim 13, wherein the at least one processor is further configured to switch a slot format from a first slot format to a second slot format, the first slot format and the second slot format being associated with a plurality of slots, an occurrence of a transmission conflict included in at least one slot of the plurality of slots.

17. The apparatus of claim 16, wherein the request for the HARQ-ACK feedback is transmitted per component carrier (CC) when the switch of the slot format from the first slot format to the second slot format causes the transmission conflict to occur on more than one CC.

18. The apparatus of claim 16, wherein the HARQ-ACK feedback corresponds to an instance of HARQ-ACK feedback that occurs after the switch of the slot format from the first slot format to the second slot format.

19. The apparatus of claim 16, wherein the switch of the slot format from the first slot format to the second slot format is based on one or more traffic patterns.

20. The apparatus of claim 16, wherein the at least one processor is further configured to transmit, to the UE, an indication of the switch of the slot format from the first slot format to the second slot format.

21. The apparatus of claim 13, wherein the at least one processor is further configured to cancel the HARQ-ACK feedback based on the at least one resource that is unavailable.

22. The apparatus of claim 13, wherein the HARQ-ACK feedback corresponds to semi-persistent scheduling (SPS) physical uplink control channel (PUCCH) HARQ.

23. The apparatus of claim 13, further comprising at least one of an antenna or a transceiver coupled to the at least one processor, wherein the one or more one-shot HARQ-ACK codebooks correspond to one or more enhanced Type 3 HARQ-ACK codebooks.

24. The apparatus of claim 13, wherein the at least one processor is further configured to monitor for the HARQ-ACK feedback associated with the at least one resource that is unavailable.

25. The apparatus of claim 13, wherein the DCI includes an indication associated with a particular bit, the particular bit indicative of whether the request is for deferred semi-persistent scheduling (SPS) physical uplink control channel (PUCCH) HARQ or for cancelled HARQ-ACK feedback, wherein the request is received when the HARQ-ACK feedback is not cancelled.

26. A method of wireless communication at a user equipment (UE), comprising:
receiving, from a base station, downlink control information (DCI) including a request for hybrid automatic repeat request (HARQ)-acknowledgment (ACK) (HARQ-ACK) feedback associated with at least one resource that is unavailable, the HARQ-ACK feedback including one or more one-shot HARQ-ACK codebooks including one or more bits; and
transmitting, to the base station, the HARQ-ACK feedback associated with the at least one resource that is unavailable, the HARQ-ACK feedback including the one or more one-shot HARQ-ACK codebooks including the one or more bits.

27. The method of claim 26, wherein the at least one resource that is unavailable is indicated in the DCI including the request for the HARQ-ACK feedback.

28. The method of claim 26, wherein the DCI includes an indication of one or more HARQ processes for one or more serving cells associated with the at least one resource that is unavailable.

29. The method of claim 26, wherein the one or more one-shot HARQ-ACK codebooks correspond to one or more enhanced Type 3 HARQ-ACK codebooks.

30. A method of wireless communication at a base station, comprising:
transmitting, to a user equipment (UE), downlink control information (DCI) including a request for hybrid automatic repeat request (HARQ)-acknowledgment (ACK) (HARQ-ACK) feedback associated with at least one resource that is unavailable, the HARQ-ACK feedback based on one or more one-shot HARQ-ACK codebooks including one or more bits; and
receiving, from the UE, the HARQ-ACK feedback associated with the at least one resource that is unavailable, the HARQ-ACK feedback including the one or more one-shot HARQ-ACK codebooks including the one or more bits.

* * * * *